(12) United States Patent
Song et al.

(10) Patent No.: US 7,924,162 B2
(45) Date of Patent: Apr. 12, 2011

(54) TAG IDENTIFICATION SYSTEM, TAG READING APPARATUS, AND METHOD FOR DETERMINING SEQUENCE OF TAGS

(75) Inventors: Chen Song, Beijing (CN); Bo Zhou, Beijing (CN); Yabo Wang, Beijing (CN); Xiaowei Liu, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 432 days.

(21) Appl. No.: 12/182,208

(22) Filed: Jul. 30, 2008

(65) Prior Publication Data
US 2009/0051494 A1 Feb. 26, 2009

(30) Foreign Application Priority Data
Jul. 30, 2007 (CN) .......................... 2007 1 0135861

(51) Int. Cl.
*G08B 13/14* (2006.01)
(52) U.S. Cl. ............... 340/572.7; 340/572.1; 340/572.2; 340/572.3; 340/572.4; 340/572.5; 340/572.6; 340/572.8; 340/572.9; 340/10.1; 340/10.2; 340/10.3; 340/10.4; 340/10.5; 340/10.6; 235/375; 235/376; 235/377; 235/378; 235/385

(58) Field of Classification Search .... 340/572.1–572.9, 340/10.1–10.6; 235/375–385
See application file for complete search history.

(56) References Cited

U.S. PATENT DOCUMENTS
2006/0077039 A1 * 4/2006 Ibi et al. ...................... 340/10.1
* cited by examiner

*Primary Examiner* — George A Bugg
*Assistant Examiner* — Ojiako Nwugo
(74) *Attorney, Agent, or Firm* — Sughrue Mion, PLLC

(57) ABSTRACT

The invention provides a tag identification system, a tag reading apparatus, and a method for determining sequence of tags. According to an aspect of the invention, a tag identification system comprises a tag reading apparatus and a plurality of tags, wherein: the tag reading apparatus has at least two antennas, wherein the apparatus transmits an interrogation signal within the coverage of each of the antennas; the plurality of tags sequentially pass by the coverage of each of the at least two antennas, each of the plurality of tags returning a reply to the at least two antennas in response to a received interrogation signal; and the tag reading apparatus includes a sequence determination unit which determines the sequence in which the plurality of tags pass by based on replies returned from the plurality of tags and received by the at least two antennas.

15 Claims, 14 Drawing Sheets

TAG IDENTIFICATION SYSTEM, TAG READING APPARATUS, AND METHOD FOR DETERMINING SEQUENCE OF TAGS

TECHNICAL FIELD

The invention generally relates to computer systems, and more particularly, to a tag identification system, a tag reading apparatus, and a method for determining sequence of tags.

BACKGROUND

As a technique for performing noncontact bi-directional communication via radio frequency to exchange data for the purpose of identification, Radio Frequency Identification (RFID) is gaining increasingly wide application.

A typical RFID system generally includes two parts, namely an RFID reader and an RFID tag. The RFID tag is located on the object to be identified and is the data carrier in the RFID system. A typical RFID tag includes a microchip that stores data and a coupling element, such as a coiled antenna, for carrying out radio frequency communication with the RFID reader. RFID tags may be either active or passive. Active RFID tags have an on-tag power supply (such as a battery) and can actively send an RF signal for communication, while passive RFID tags obtain all of their power from the interrogation signal of the RFID reader and either reflect or load modulate the RFID reader's signal for communication. Most RFID tags, both passive and active, communicate only when they are interrogated by an RFID reader.

An RFID reader can read data from an RFID tag and/or write data to the RFID tag. A typical RFID reader includes a radio frequency module, a controller, and a coupling element (such as an antenna) to carry out radio frequency communication with an RFID tag. In addition, many RFID readers are fitted with an information reading interface that enables them to communicate their received data to a data processing subsystem, e.g., a database running on a personal computer.

In most RFID systems, an interrogation signal transmitted by an antenna of an RFID reader can be received by a tag within the coverage (also referred to as "RF region" hereinafter) of the antenna. The size of the coverage depends on the operating frequency of the RFID reader and the size of the antenna. When an RFID tag passes by the coverage of the antenna, it can detect the interrogation signal of the reader, and transmit as reply the information or data on the object to be identified stored therein in response to the interrogation signal. The reader identifies the object identified by the RFID tag according to the received reply returned from the RFID tag.

Compared with contemporary or prior identification techniques such as barcode, magnetic card, IC card or the like, RFID bears such advantages as noncontactness, wide operating range, adaptation to hostile environment, ability of identifying mobile objects and the like. Due to these advantages, RFID has been increasingly used in logistics management. However, when RFID is used in logistics management, real-time management is a hard problem in RFID application layer, as shown in FIG. 1.

One important case in real time management is moving sequence real-time detection problem in many applications such as airport baggage handling system, postal sorting system, food sorting system, etc. An example of the moving sequence real-time detection problem is shown in FIG. 2.

Currently, it is difficult to detect individual RFID tag in a moving sequence, because:

1. When an RFID reader transmits a signal to tags, more than one tag can answer the reader simultaneously.
2. The RFID reader can read a number of tags simultaneously. However, the information read is simple and confused in order, as shown in FIG. 3.
3. It is hard to acquire more specific information, such as individual precise time of every tag in the random interval moving sequence.
4. Collision happens when multiple tags enter RF region simultaneously. Collision throws the natural order into confusion completely, which is mainly manifested as
    a. State information is unreliable due to lack of internal power source in the tag in the case of passive tags.
    b. Tags cannot communicate with each other. This is a special case of the multiple channel access communication issue.
    c. Tags have limited memory and computation capabilities. There exists little calculation possible at tags.
    d. Existing researches focus on anti-collision technology, which is basically helpless for detecting the correct order of a moving sequence.
5. Sequence detection efficiency will be a bottleneck as the anti-collision capacity of the reader increases. Current readers can read more than 600 C1 G2 (Class 1 Generation 2) tags per second. However, it will take about tens of milliseconds to read a single tag in real environment for a special RFID reader. That is, the "global scroll" efficiency is less than "inventory" efficiency.

Sequence detection problem is very difficult for existing method. However, it becomes more and more important because there exist a big market opportunity for moving sequence detection in RFID application. However, most of the current moving sequence detection systems are costly and time-consuming. In one hand, for example, the airport baggage handling systems in Beijing Capital Airport handle approximately 110,000 passengers per day averagely. Current average mishandled bags are more than 5 per 1,000 passengers. 1 Every missing or mishandled bag costs averagely at least 500 RMB. Therefore, the cost due to missing baggage is 275,000 RMB per day and 100.375 million RMB per year. On the other hand, it is time-consuming for individual passenger and air company. For example, the S-3000E Tilt-Tray Sorter is the latest generation in a long line of sorting equipment with sorter velocity up to 3.5 m/sec. Suppose baggage-handling speed is 1 piece of baggage per second. Capacity of an Airbus 380 is 600 passengers, and every passenger has 2 pieces of baggage. Thus the handling time is 1200 seconds, i.e., 20 minutes. If we could increase the handling speed by 5 times, i.e., 5 pieces of baggage per second, then the total handling time would be 4 minutes. This means huge saving of time for passengers and air companies.

Moving confused sequence comprises ordered moving pairs that sojourn in an observed region concurrently with a high probability, i.e., the observed value of sequence Seq={B→A} in observed region X is $\overline{Seq}_{x \in X}$=({A→B} or {B→A}). The confused sequence information has the following characteristics:

a. Collision occurs when objects A and B enter the observed region
b. There exists a short period in which only individual A presents before collision begins
c. There exists a short period in which only individual B presents after collision finishes
d. No precise method to distinguish the bound of single object and multiple objects and control the observation.
e. The interval between objects A and B is uncertain.

Numerous tags can be present in the interrogation area of an RFID reader. A reader in an RFID system can transmit an interrogation message to the tags. Upon receiving the message, all tags send a response back to the reader. If more than one tag responds, their responses will collide in the RF communication channel, and thus cannot be received by reader. The problem of solving this collision is generally referred to as the anti-collision problem, and the ability to solve this is an important ability.

The simplest of all the multi-access procedures is the ALOHA procedure. As soon as a data packet is available it is sent from the tag to the reader. This is a tag-driven stochastic TDMA procedure. The procedure is used exclusively with read-only tags, which generally have to transfer only a small amount of data (serial numbers), this data being sent to the reader in a cyclical sequence. The data transmission time represents only a fraction of the repetition time, so there are relatively long pauses between transmissions. Furthermore, the repetition times for the individual tags differ slightly. There is therefore a certain probability that two tags can transmit their data packets at different times and the data packets will not collide with one another. The time sequence of a data transmission in an ALOHA system is shown in FIG. 4.

Some kinds of slotted Aloha protocol are broadly used as the basic concept of anti-collision method in commercial tag products, for example, 'I-code' by PHILIPS, ISO/IEC-18000-6C and so on. The main idea of this algorithm is to speed up the inventorying process by decreasing useless slots, vacant or collided. However, it is helpless to decide the sequence that RFID tags enter RF region because the correct order has been thrown into confusion by the random selection method in Aloha and related anti-collision algorithm.

The existing researches focus on how to read a possible great number of tags in shortest time. It is helpless or even misleading in detecting the correct order of a moving sequence. The purpose of existing researches is shown in FIG. 5.

As described above, existing solutions focus on large-power method for reading large-number tags. Current anti-collision algorithms throw the order of multiple tags into confusion completely. These methods provide approaches to detect multiple tags in a short time. However, the information read merely includes those that bear no relationship with sequence, such as number, crude time, etc.

It can be seen that there is a need for a system and method for practically and efficiently detecting the correct order of moving RFID tags.

SUMMARY OF THE INVENTION

The object of the invention is to provide a tag identification system, a tag reading apparatus, and a method for determining sequence of tags, which practically and efficiently detect the correct order of moving RFID tags.

According to a first aspect of the invention, there is provided a tag identification system comprising a tag reading apparatus and a plurality of tags, wherein: the tag reading apparatus has at least two antennas, wherein the apparatus transmits an interrogation signal within the coverage of each of the antennas; the plurality of tags sequentially pass by the coverage of each of the at least two antennas, each of the plurality of tags returning a reply to the at least two antennas in response to a received interrogation signal; and the tag reading apparatus includes a sequence determination unit which determines the sequence in which the plurality of tags pass by based on replies returned from the plurality of tags and received by the at least two antennas.

According to a second aspect of the invention, there is provided a tag reading apparatus for reading a plurality of tags sequentially passing by the apparatus, the tag reading apparatus at least comprising: at least two antennas for transmitting an interrogation signal to the plurality of tags passing by the coverage thereof and receiving a reply returned from each of the tags in response to the received interrogation signal; and a sequence determination unit which determines the sequence of the tags based on replies returned from the plurality of tags and received by the at least two antennas.

According to a third aspect of the invention, there is provided a method for determining the sequence in which a plurality of tags pass by a tag reading apparatus, comprising: an interrogation signal transmitting step for transmitting an interrogation signal from each of the at least two antennas of the tag reading apparatus to the plurality of tags within a coverage thereof; a reply receiving step for receiving replies returned from the plurality of tags in response to the received interrogation signal by each of the at least two antennas of the tag reading apparatus; and a sequence determination step for determining the sequence in which the plurality of tags pass by based on the received replies.

The technical solution of the invention substantially attains the following technical effects:

1. Information is precisely classified as to whether it comes from a single-region or a multiple-region, and it is easier to catch a single-region;

2. Approaches and criteria for determining the size of a RF region suitable for sequence detection are provided;

3. It is easily to deploy
  a. for readers with different frequencies,
  b. for different requirements of moving speed,
  c. for different distance requirements, and
  d. for different communication speeds;

3. It is independent of anti-collision algorithm or protocol; and

4. It has a reliable detection correct ratio.

The above and other features and advantages of the invention will be described in detail below with reference to the drawings.

DETAILED DESCRIPTION

Hereinafter, the features and advantages of the invention will be described in detail in connection with preferred embodiments of the invention with reference to the drawings.

Figure 1:
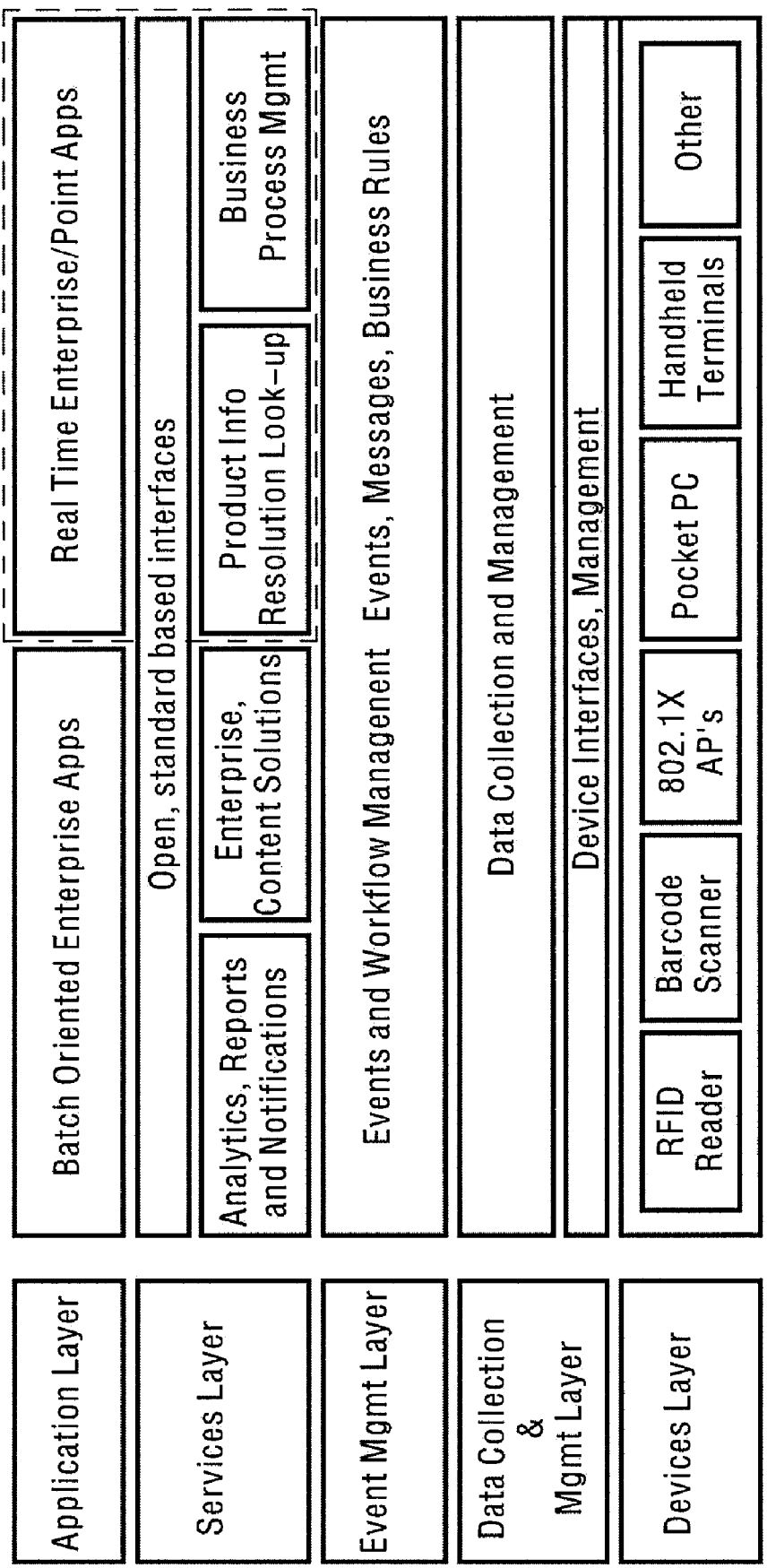
FIG. 1 shows the real-time management problem in RFID application layer.
Figure 2:
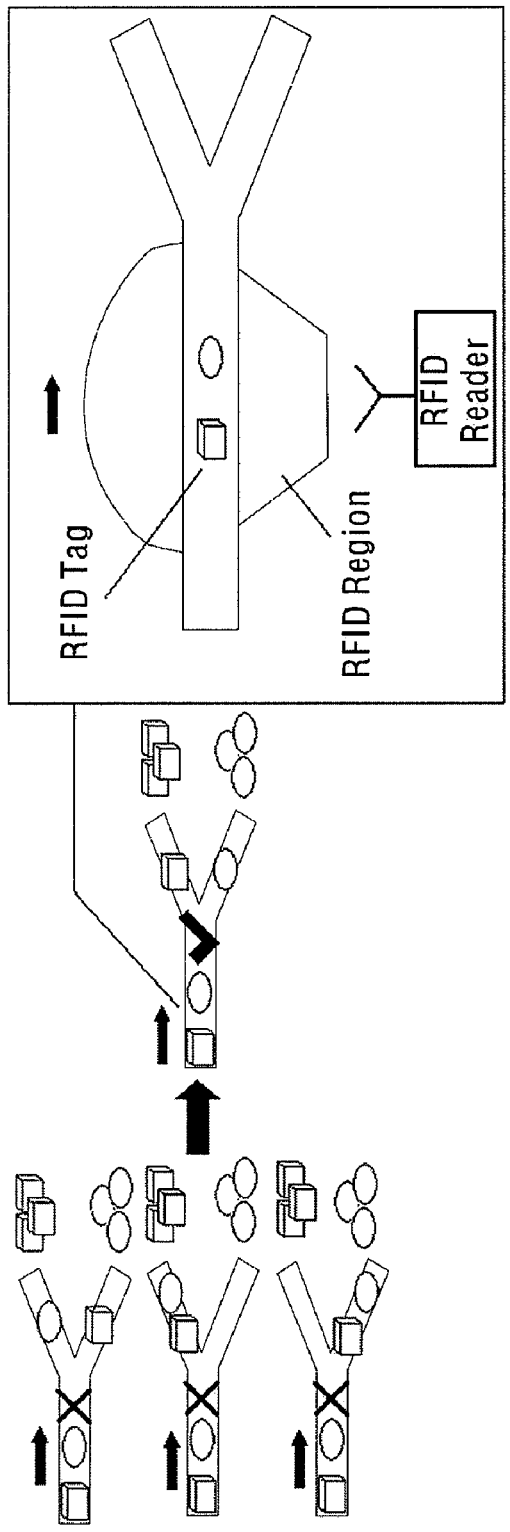
FIG. 2 shows an example of the moving sequence real-time detection problem.
Figure 3:
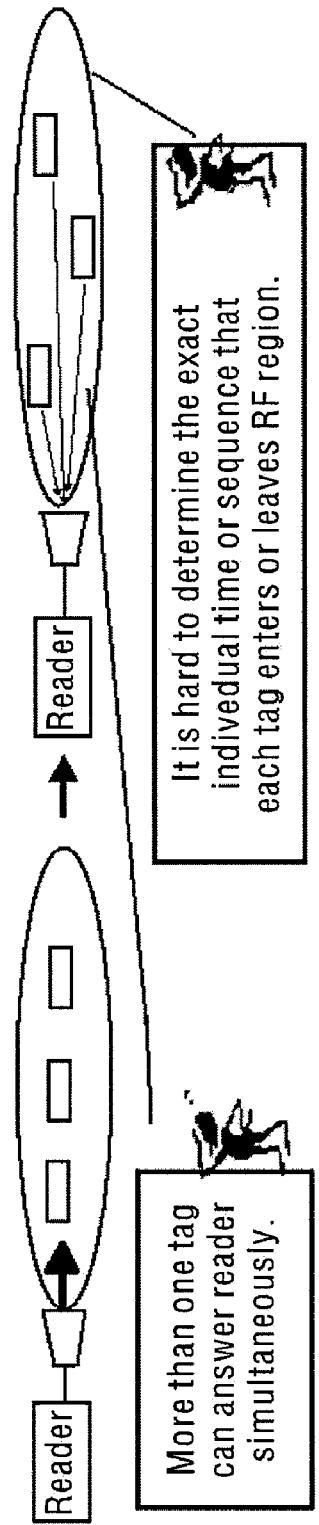
FIG. 3 shows the problem of confused order due to simultaneous responses by multiple tags.
Figure 4:
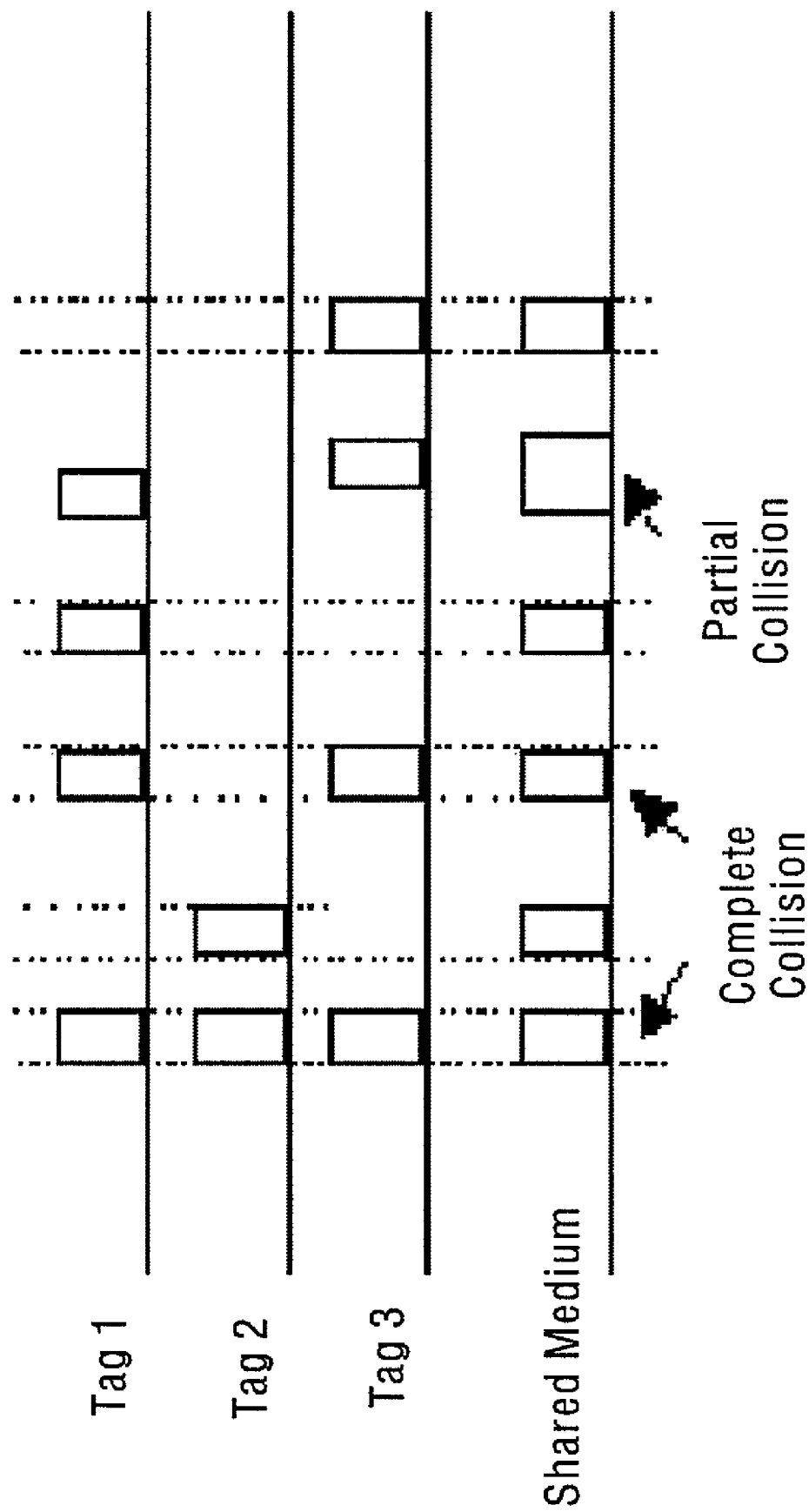
FIG. 4 shows the time sequence of a data transmission in an ALOHA system.
Figure 5:
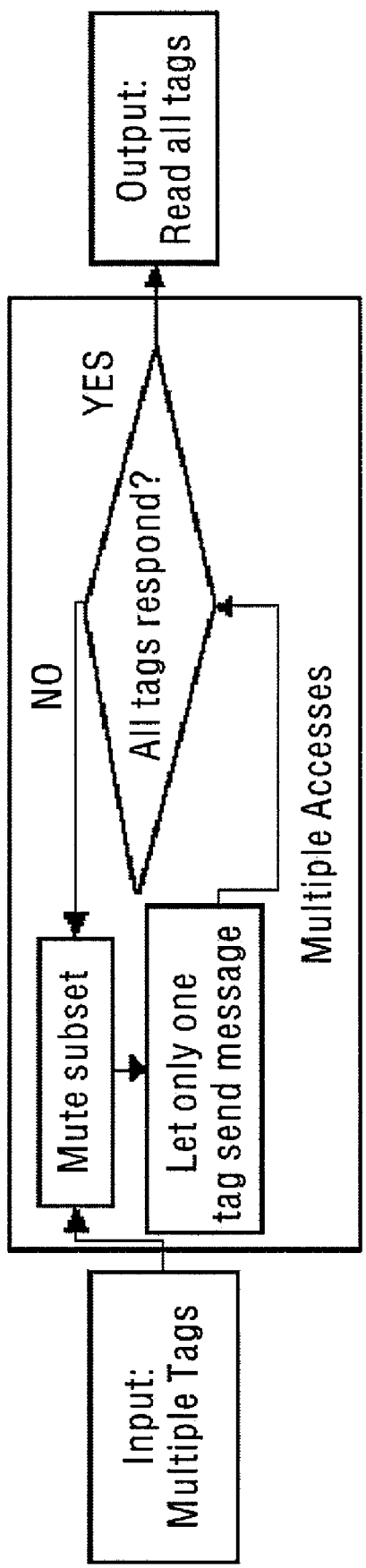
FIG. 5 shows the purpose of existing researches.
Figure 6:
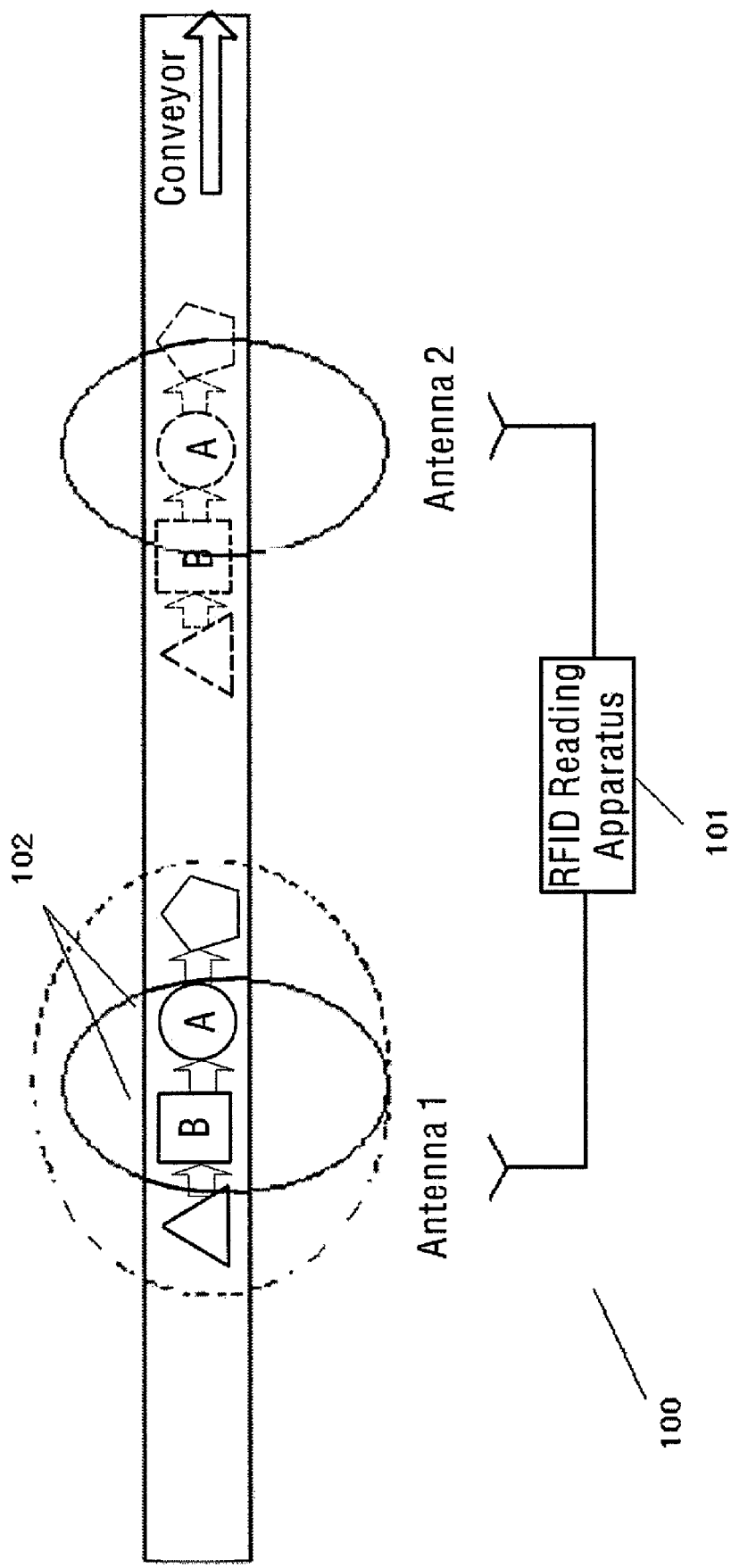
FIG. 6 shows a schematic diagram of an RFID system according to an embodiment of the invention.

FIG. 6 shows a schematic diagram of an RFID system 100 according to an embodiment of the invention. The embodiment represents the case of an airport baggage handling system. It is to be appreciated by those skilled in the art that the RFID system according to the invention is also applicable to other logistics management systems.

As shown in FIG. 6, the RFID system 100 of the embodiment of the invention includes an RFID reading apparatus 101 and a plurality of RFID tags 102. Pieces of baggage attached with RFID tags 102 are transported by a conveyor, and the tags form a moving sequence. RFID reading apparatus 101 transmits interrogation signals to those tags within the coverage thereof on the conveyor, and determines the order of the tags on the conveyor according to the replies returned from the tags in response to the interrogation signals, so as to correctly sort the pieces of baggage attached with the tags.

Since determination of the order of a plurality of tags can ultimately be decomposed into determinations of the order of two adjacent tags, in the present embodiment, the principle of the RFID system 100 according to the invention will be explained with determination of the order of two tags 102A and 102B on the conveyor as an example.

Figure 7:
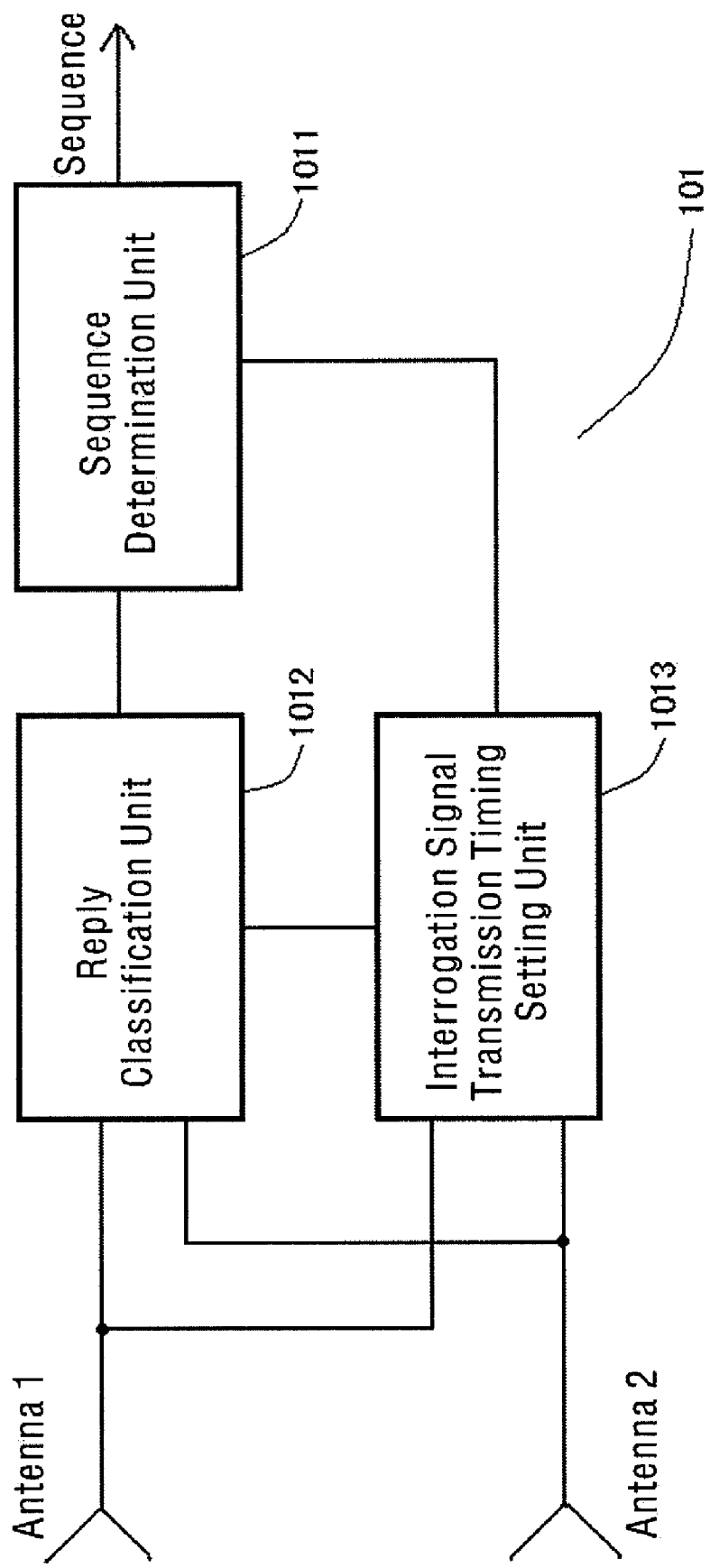
FIG. 7 is a schematic block diagram showing the structure of the RFID reading apparatus shown in FIG. 6.

FIG. 7 is a schematic block diagram showing the structure of the RFID reading apparatus 101. As shown in FIG. 7, the RFID reading apparatus 101 according to the invention includes at least two antennas for transmitting and receiving data through radio frequency communications. In this example, the RFID reading apparatus 101 includes an antenna 1 and an antenna 2. Each antenna has a corresponding coverage, and tags within its coverage can receive an interrogation signal transmitted by the RFID reading apparatus 101 through the antenna and can return a reply in response to the interrogation signal such that the RFID reading apparatus 101 can receive the reply through the antenna.

The RFID reading apparatus 101 further includes a sequence determination unit 1011, a reply classification unit 1012 and an interrogation signal transmission timing setting unit 1013.

The sequence determination unit 1011 determines the order in which the tags 102A and 102B pass by, based on replies returned from the tags 102A and 102B and received by the antennas 1 and 2.

The reply classification unit 1012 classifies the replies received by the antennas 1 and 2 to determine whether the replies come from a single-region or a multiple-region, and sends the result of the classification of the replies to the sequence determination unit 1011. Here, a single-region means the received replies include only replies returned from one tag, and a multiple-region means the received replies include replies returned from more than one tag.

The interrogation signal transmission timing setting unit 1013 is used for setting the timing of transmitting an interrogation signal from antennas 1 and 2. Specifically, in the event that the sequence determination unit 1011 cannot uniquely determine the order of the RFID tags 102A and 102B based on replies received by antenna 1, the interrogation signal transmission timing setting unit 1013 adjusts the timing of transmitting an interrogation signal from antenna 2. Needless to say, if the sequence determination unit 1011 can uniquely determine the order of the RFID tags 102A and 102B based on replies received by antenna 1 (for example, the replies received through antenna 1 include one single-region and one multiple-region), it is unnecessary to determine the order of these two tags by using the replies received by antenna 2.

Actually, the operations of the sequence determination unit 1011, reply classification unit 1012 and interrogation signal transmission timing setting unit 1013 in the RFID reading apparatus 101 of the invention, as a whole, form an approach to identify the order of tags based on Information Partition and Ordinal Optimization (OO). The principles and features thereof will be described in detail below.

As described above, the reply classification unit 1012 classifies the replies received by the antennas 1 and 2 to determine whether the replies come from a single-region or a multiple-region.

Figure 8:
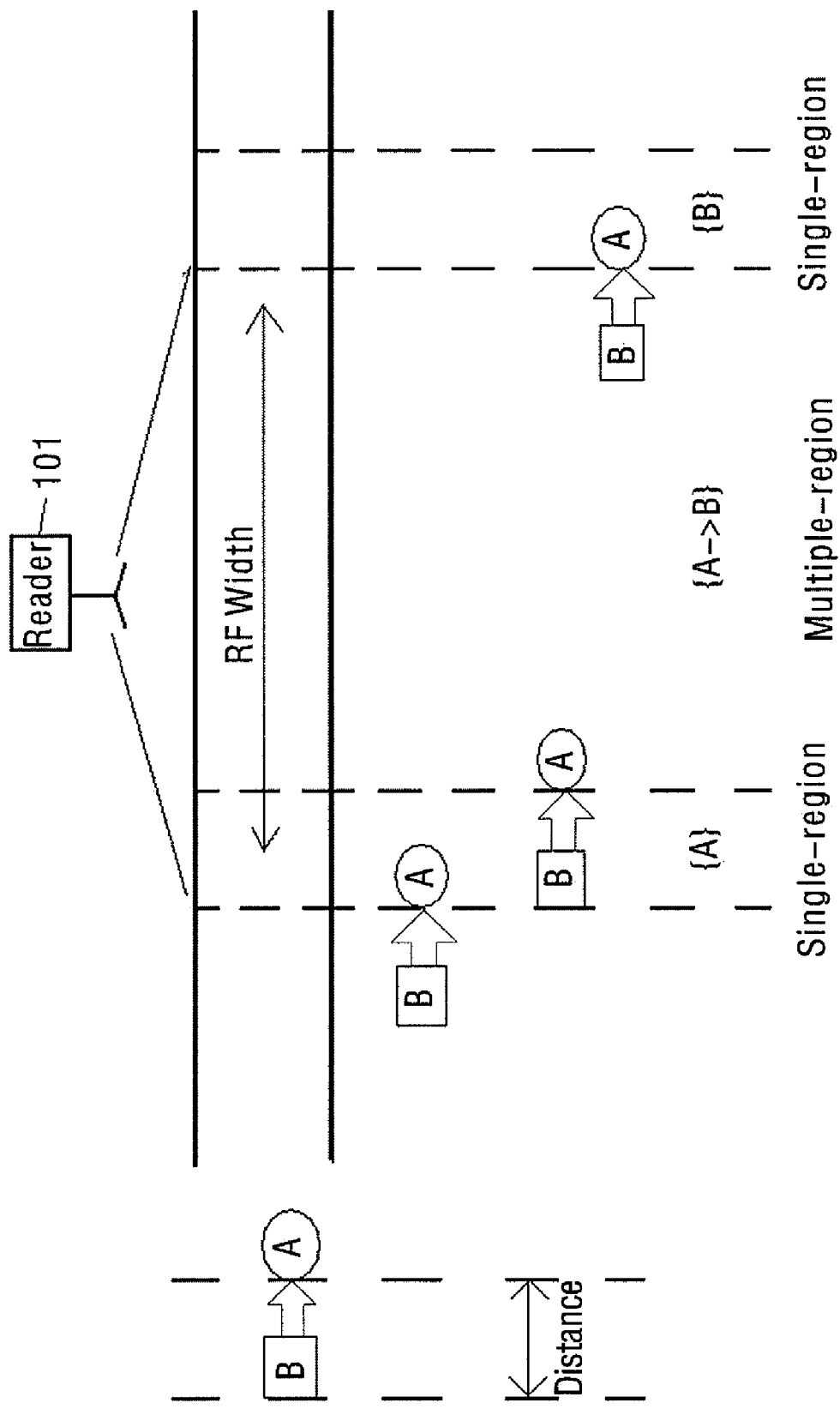
FIG. 8 schematically shows three phases that may exist when two tags are read.

Suppose that objects A and B attached with tags 102A and 102B respectively on the conveyor pass by the RFID reading apparatus 101 in such an order that A is earlier than B. For each of the antenna 1 and antenna 2, there may be 3 phases when reading the two tags, as shown in FIG. 8. Taking antenna 1 as an example:

1. In the first phase, only the RFID tag 102A on the object nearest to the RFID reading apparatus, i.e. object A, is read. It is called "single-region".

2. In the second phase, RFID tag 102B also enters into the coverage of antenna 1 as the conveyor moves. The RFID reading apparatus finds that there are 2 tags in the coverage of antenna 1, and a conventional anti-collision algorithm is applied to read the multiple tags. The result of reading may be either {B->A} (A is earlier than B) or {A->B} (B is earlier than A). Therefore, it is called "confusing region", "collision region", "double-region" or "multiple-region". The correct order is thrown into confusion completely.

3. In the last phase, tag 102A leaves the reading field and tag 102B still remains in the reading field. Therefore, this region is also called "single-region."

Successful sampling in single-region is a key factor for deciding the correct order between tags 102A and 102B. It is because that:

1. If two samples are both picked in a single-region, e.g., if $T\{A\}<T\{B\}$, then {B->A} is a correct order (both samplings are in single-region). Here, $T\{A\}$ represents a timing at which data containing only a reply from tag 102A, which data will be referred to as A reply, is received, and $T\{B\}$ represents a timing at which data containing only a reply from tag 102B, which data will be referred to as B reply, is received. $T\{A\}<T\{B\}$ means the timing at which the A reply is received is before the timing at which the B reply is received.

2. If one sample is picked in a single-region, and another sample is picked in a multiple-region, for example, if $T\{A\}<T\{A->B\}$ or $T\{A\}<T\{B->A\}$, or $T\{B\}>T\{A->B\}$ or $T\{B\}>T\{B->A\}$, then {B->A} is the correct order (at least one sampling is in single-region). Here, $T\{A->B\}$ represents a timing at which data containing replies returned from tags 102A and 102B wherein the reply returned from the tag 102B comes earlier than the reply returned from the tag 102A (which data will be referred to as B-earlier-than-A reply), is received, and $T\{B->A\}$ represents a timing at which data containing replies returned from tags 102A and 102B wherein the reply returned from the tag 102A comes earlier than the reply returned from the tag 102B (which data will be referred to as A-earlier-than-B reply), is received. Similarly as above, T{A}<T{A->B} means the timing at which the A reply is received is before the timing at which the B-earlier-than-A reply is received By the same token, as to three or more tags, the relative order thereof can be easily determined as long as the orders between two adjacent tags are determined as above.

Figure 9:
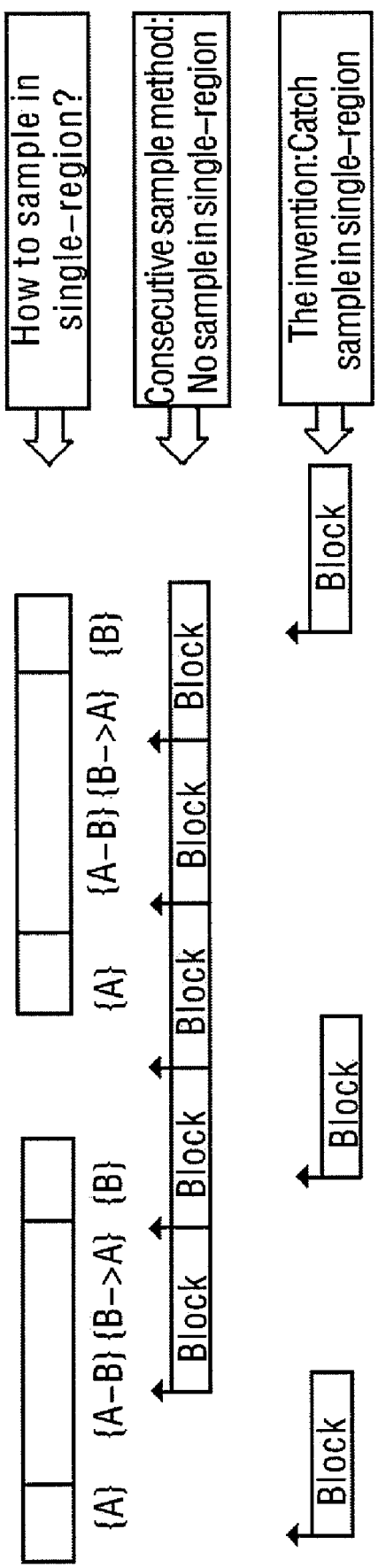
FIG. 9 shows the effects of different picking methods.

Therefore, the order can be determined if samples are picked in single-regions. How to pick a sample in a single region is a crucial problem. Conventional consecutive sample methods are not efficient, as shown in FIG. 9. There exists a large probability that all samples caught by communication blocks are captured in multiple-regions and no sample is captured in a single-region. However, without samples from single-regions, it is impossible to decide the correct sequence. As mentioned above, it is hard for a precise method to catch a sample from a single-region because it is hard to distinguish the boundary between a single-region and a multiple-region. Therefore, a crude method on the basis of Ordinal Optimization (OO) is proposed in this invention. The effect of different picking methods is shown in FIG. 9.

The purpose of the problem of how to pick a sample in a single region is to obtain good enough designs through searching and selecting designs in a design space. Exhaustive search is generally inefficient and even impossible, which results in a very large selected subset. The search space is very huge and unlimited because it is a continuous space. Therefore, the problem must be formulated in an optimization problem of discrete event systems (DES).

Ordinal Optimization (OO) is a simulation based optimization method proposed by Prof. Ho in 1990's. The Ordinal Optimization method offers an efficient way to simulation based optimization approach. It intends to find a good or satisfying solution among a large number of candidates rather than the true optimum with a computationally simple but possibly crude model to estimate the performance of a set of plans or choices. The good enough choices are defined as a set that can be quantified and determined with high probability. Based on the crude model, a subset of these choices, called selected subset S, is selected as the observed "good enough" set. Ordinal Optimization may then quantify the degree of "matching" or "alignment" between the set S and the true good enough subset G. Ordinal Optimization is particularly attractive for stochastic discrete optimization since it is immune to large noise with affordable computational complexity.

Figure 10:
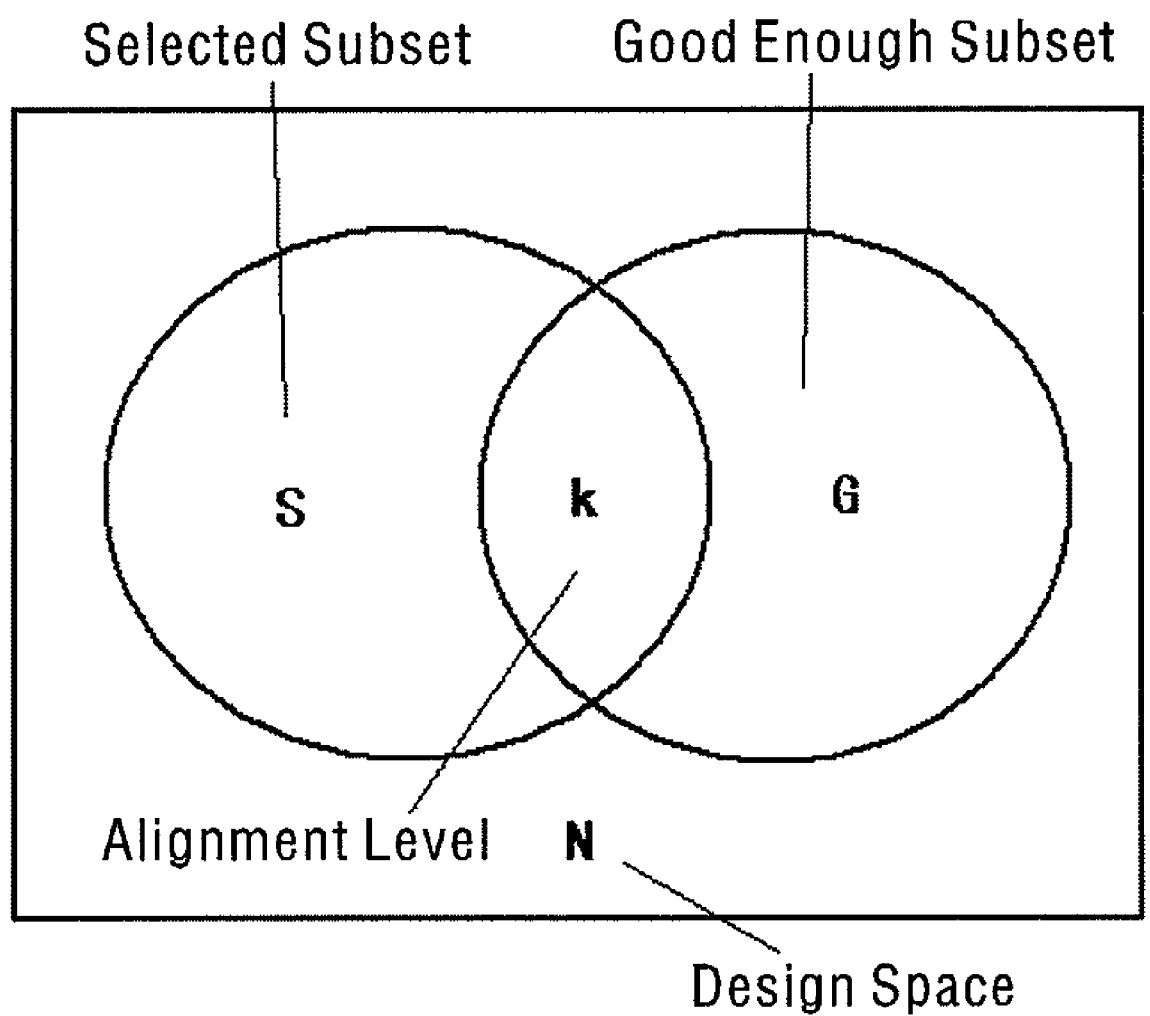
FIG. 10 shows the basic principle of Ordinal Optimization.

As explained above, the basic idea of Ordinal Optimization is based on two tenets: ordinal comparison and goal softening. First, it is much easier to determine whether or not decision A is better than B than determining "A-B=?". The relative order of A vs. B converges exponentially fast while the "value" converges at a rate of $1/t^{1/2}$. Accurate cardinal value may not be necessary when determining which one of A and B is better. It emphasizes the choice (order) rather than estimating the utility (value) of the choices. Another key idea of Ordinal Optimization is goal softening by maintaining reasonable "matching" outcomes between the good enough subset G and the selected subset S with efficiency and confidence. The criterion for the good enough subset G is chosen as the top n-percentile of the decision space without the need to find the true optimum. The basic idea of Ordinal Optimization is shown in FIG. 10.

The meaning of "alignment probability (AP)" will be explained first. For unconstrained problems, by "matching" or "alignment", we mean the intersection of the good enough subset G and the selected subset S. AP is defined as:

$$AP = \text{Prob}\{|G \cap S| \geq k\} \quad (1)$$

where k is called the alignment level.

Blind Picking (BP) as a selection rule involves selecting a subset S from decision space Θ: 1) randomly, 2) without replacement, and 3) without comparison. This selection rule would warrant that every decision has the same tendency to be evaluated to any rank in the decision space. In addition, the AP for this special case can be expressed in a closed form, i.e., $$AP(|G \cap S| \geq k) = \sum_{i=k}^{\min(g,s)} \frac{\binom{g}{i}\binom{N-g}{s-i}}{\binom{N}{s}} \quad (2)$$

which is the hypergeometric distribution, where N is the size of decision space. For the blind picking case, the AP depends on:
1. The alignment level k;
2. The size of the good enough subset G (i.e., |G|=g); and
3. The size of the selected subset S (|S|=s).

The general Ordinal Optimization problem can be formulated into the following optimization problem:

$$\text{Min}|S| \quad (3)$$

$$s.t. |\{\Theta_i | \Theta_i = \{A\} \text{ or } \Theta_i = \{B\}\}| > 0; \quad (4)$$

$$|\Theta| = N; \quad (5)$$

$$|G| = r\% \cdot N \text{ (top-r \% of } \Theta\text{)} \quad (6)$$

$$\text{Prob}(|G \cap S| > k) > P_{req} \quad (7)$$

where
S={Θ₁, Θ₂, ..., Θₛ} - - - Selected subset, |S|=s
Θᵢ - - - the set of tag label at time tᵢ
Θ - - - Design space
G - - - Good enough subset, |G|=g
k - - - Alignment Level The probability of that the alignment level between G and S is k is:

$$\text{Prob}(|G \cap S| = k) = \frac{\binom{g}{k}\binom{N-g}{s-k}}{\binom{N}{s}} \quad (8)$$

Therefore, the probability of that the alignment level between G and S at least is k is:

$$\text{Prob}(|G \cap S| \geq k) = \sum_{i=1}^{\min(g,s)} \frac{\binom{g}{i}\binom{N-g}{s-i}}{\binom{N}{s}} \quad (9)$$

Therefore the minimal size of the selected subset S is $$s = \arg\left(\sum_{i=1}^{\min(g,s)} \frac{\binom{g}{i}\binom{N-g}{s-i}}{\binom{N}{s}} \geq P_r\right) \quad (10)$$

For the case in RFID system, S is the number of RFID detectors (readers/antennas) for detecting RFID samples (tags).

If the simple Blind Picking method is applied in this case, the design space is $T_r + T_l$ and good enough subset is $T_r$, where $T_r$ is the redundancy time of reading one RFID tag and $T_l$ is the minimal time of reading one RFID tag. Only picking sample in $T_r$ region can catch sample in single-region. Only if the sample in single-region is detected, the sequence can be decided. The probability of {at least k out of S reads catch sample in single-region} is:

$$Prob(|G \cap S| \geq k) = \sum_{i=1}^{min(T_r,s)} \frac{\binom{T_r}{i}\binom{T_l}{s-i}}{\binom{T_l+T_r}{s}} \quad (11)$$

Therefore, $$s = \arg\min\left(\sum_{i=1}^{min(T_r,s)} \frac{\binom{T_r}{i}\binom{T_l}{s-i}}{\binom{T_l+T_r}{s}} \geq P_r\right) \quad (12)$$

Figure 11:
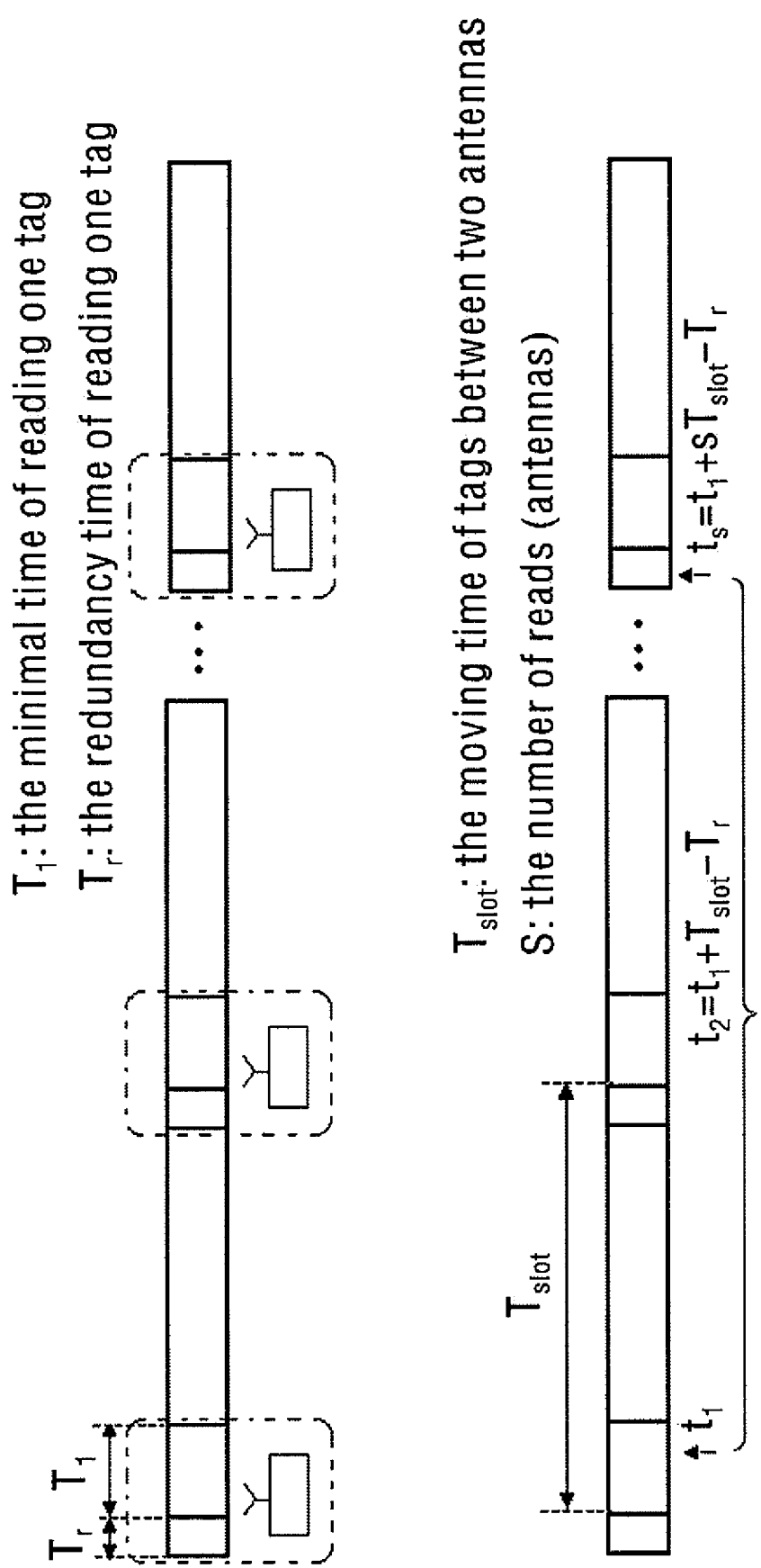
FIG. 11 shows the basic principle of the picking method according to the invention.

The problem is how to improve the method. After all, it is not efficient because it needs a large number of detectors to catch samples in single-region. According to No-Free-lunch Theorem: no algorithm can do better on the average than blind search without structural information. Therefore, it is needed to find structural information to improve the efficiency. It has been found that the main reason that sample in single-region cannot be caught is the moment is "late", i.e., the detector works at $T_l$ region, other than $T_r$ regions. Therefore, if we know the detector does not catch sample in single-region, we can inform next detector i to work "early" with time $\Delta t_i$. Therefore the good enough region is enlarged. Usually the adjustment method depends on the practical environment to improve the picking effect. The basic principle of the method is shown in FIG. 11

Suppose the increased size is $\Delta T$, the size of good enough subset becomes $T_r + \Delta T$. Therefore, the probability of {at least k out of S reads catch sample in single-region} is:

$$Prob(|G \cap S| \geq k) = \sum_{i=1}^{min(T_r+\Delta T,s)} \frac{\binom{T_r+\Delta T}{i}\binom{T_l-\Delta T}{s-i}}{\binom{T_r+T_l}{s}} \quad (13)$$

Therefore $$s = \arg\min\left(\sum_{i=1}^{min(T_r+\Delta T,s)} \frac{\binom{T_r+\Delta T}{i}\binom{T_l-\Delta T}{s-i}}{\binom{T_r+T_l}{s}} \geq P_r\right) \quad (14)$$

Thus the improvement in the probability is $$\Delta Prob(|G \cap S| \geq k) = \sum_{i=1}^{s} \frac{\binom{T_r+\Delta T}{i}\binom{T_l-\Delta T}{s-i} - \binom{T_r}{i}\binom{T_l}{s-i}}{\binom{T_l+T_r}{s}} \quad (15)$$

Figure 12:
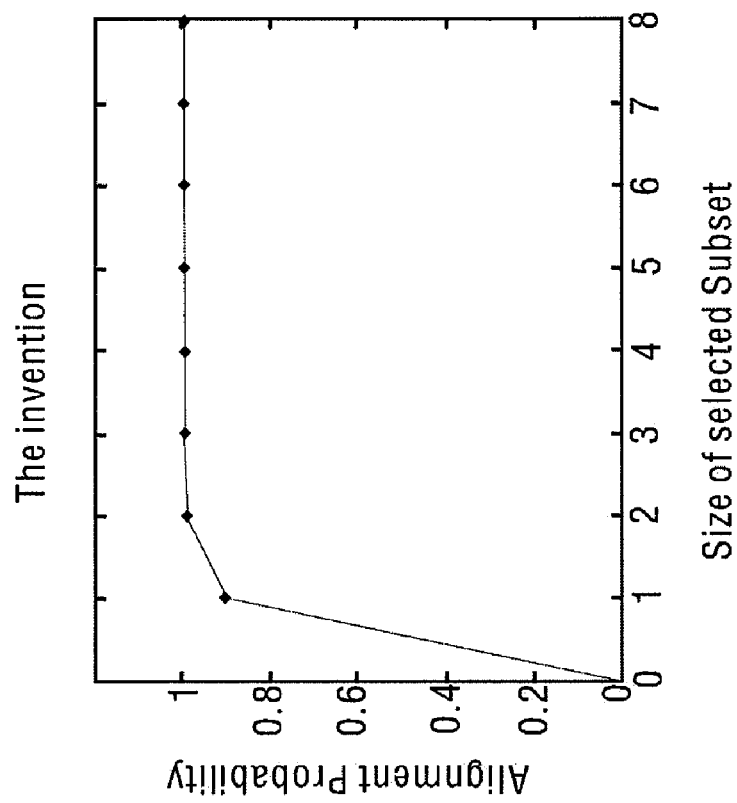
FIG. 12 shows the theoretical comparison between Pure BP algorithm and the method of the invention.
Figure 12:
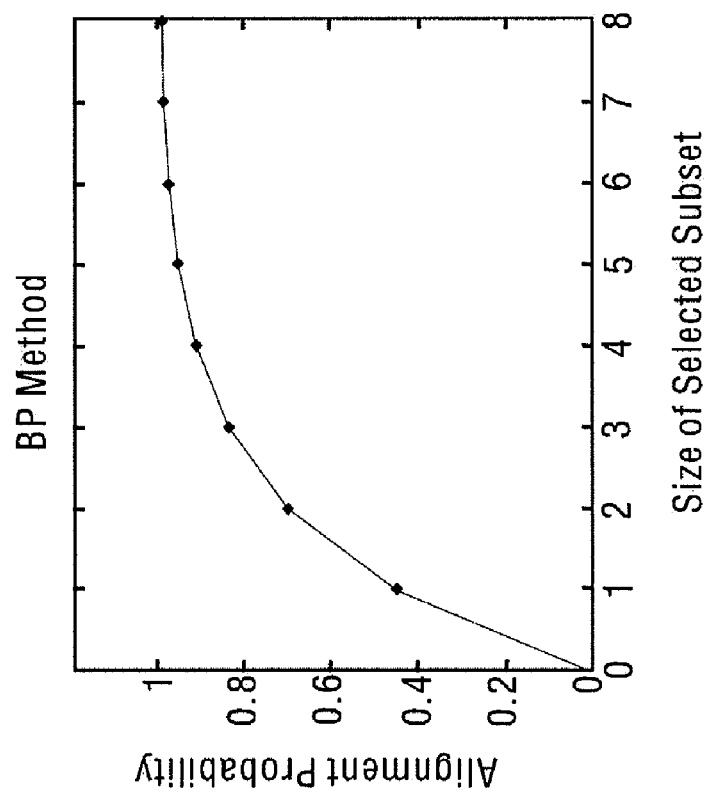

Suppose the minimal time of reading 1 RFID tag is 110 ms, and the redundancy time is 90 ms. Based on Eq. (6), the theoretical comparison between Pure BP algorithm and the method of the invention is shown in Table 1 and FIG. 12.

TABLE 1

| Reads# | 1 | 2 | 3 | 4 | 5 | 6 | 7 | 8 |
|---|---|---|---|---|---|---|---|---|
| BP | 0.4500 | 0.6987 | 0.8357 | 0.9107 | 0.9517 | 0.9861 | 0.9926 | 0.9960 |
| The invention | 0.9000 | 0.9905 | 0.9991 | 0.9999 | 1.0000 | 1.0000 | 1.0000 | 1.0000 |

It can be seen from the above table that to meet the probability requirement of sequence detection, the approach of the invention is better than BP method. For example, to meet the requirement of Alignment Probability more than 90%, BP at least needs 4 detectors, while the approach of the invention only needs two detectors to accomplish the task. This is why there are only 2 antennas arranged in the RFID reading apparatus 101. Please note that although the number of detectors in the case of the invention corresponding to the probability 90% in the above table is 1, the first detector has not been counted. Therefore, the invention of the present embodiment requires 2 detectors, that is, the RFID reading apparatus 101 needs two antennas arranged, namely antenna 1 and antenna 2.

Figure 13:
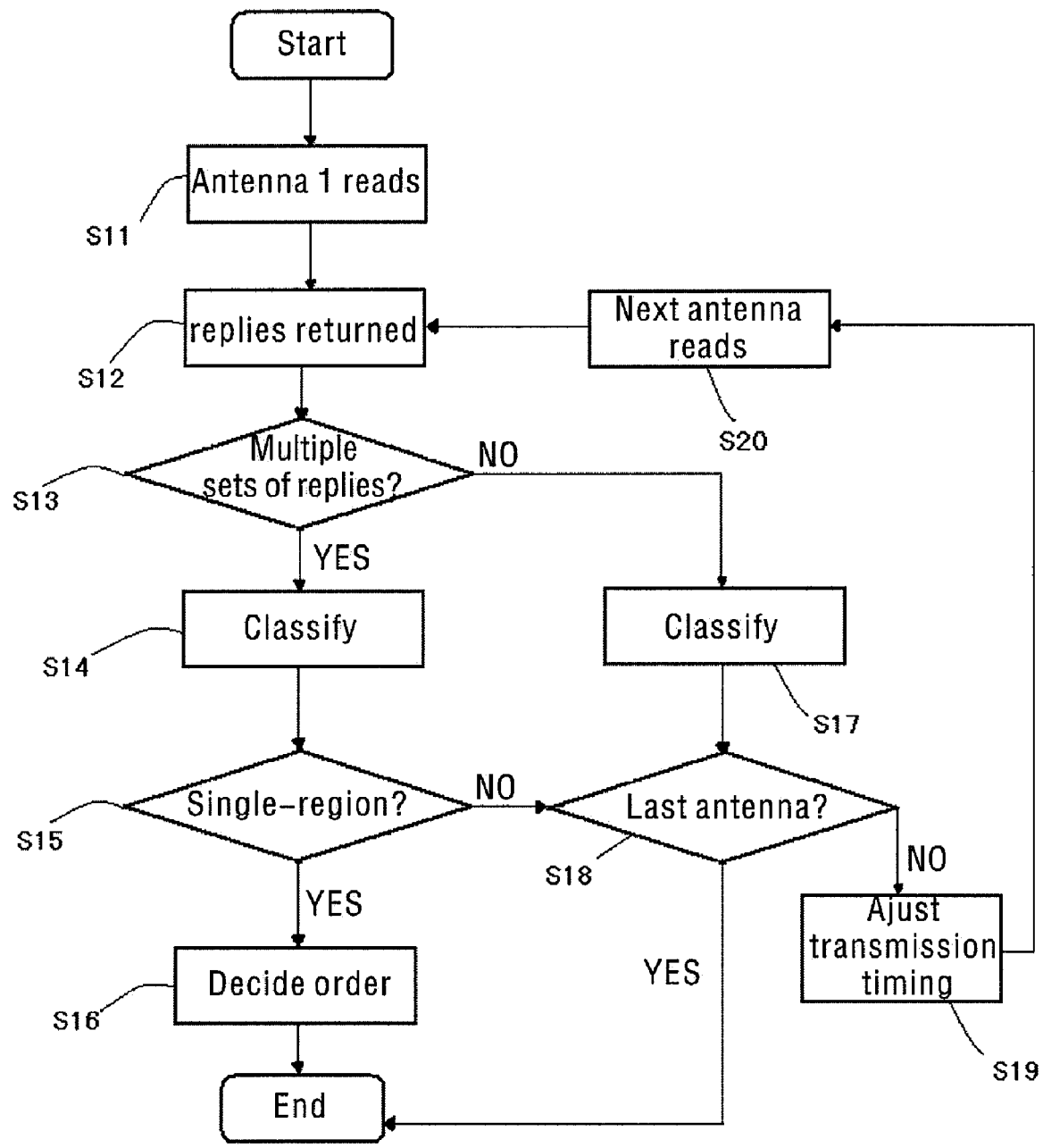
FIG. 13 shows the operation flow of the RFID reading apparatus in the RFID system shown in FIG. 6 for determining the order of a pair of RFID tags.

FIG. 13 shows the operation flow of the RFID reading apparatus 101 in the RFID system 100 shown in FIG. 6 for determining the order of a pair of RFID tags 102A and 102B.

As shown in FIG. 13, in step S11, the antenna 1 transmits interrogation signals to RFID tags 102A and 102B. In step S12, the current antenna receives the replies returned from the tags.

In step S13, it is determined whether the returned replies include a plurality of sets of replies, where each set includes replies returned from the tags in response to one interrogation signal.

If the result of determination in step S13 is "YES", then in step S14, the reply classification unit 1012 classifies the plurality of sets of replies, i.e., determines whether each set of the sets of replies comes from a single-region or a multiple-region.

In step S15, it is determined whether there is a single-region in the plurality of sets of replies. If the result in step S15 is "YES", that is, there is a single-region in the plurality of sets of replies, then in step S16, the sequence determination unit 1011 determines the order of the RFID tags 102A and 102B.

For example, if the returned replies are two sets of replies including one single-region and one multiple-region, e.g. {A} and {A, B}, or two single-regions, i.e. {A} and {B}, then the sequence determination unit 1011 may determine the sequence of the RFID tags 102A and 102B based on the result of classification and the order in which the two sets of replies are received. Then the process is ended.

On the other hand, if the result in step S13 is "NO", that is, there are no a plurality of sets of replies, in other words there is only one set of replies, then in step S17, the reply classification unit 1012 classifies this set of replies. For example, the set of replies comes from one single-region (for example {A} or {B}), or come from one multiple-region (for example {A, B}).

In step S18, it is determined whether the current antenna is the last antenna. If so, the process is ended. Otherwise, the process proceeds to step S19 where the interrogation signal transmission timing setting unit 1013 adjusts the time when the next antenna transmits an interrogation signal based on the result of the classification, and the process proceeds to step S20, where the next antenna reads the tags. Then the process loops to step S12, where the next antenna receives the replies returned by the tags.

On the other hand, if it is determined in step S15 that there are no single-regions in the returned plurality of sets of replies, that is, every set of replies is a multiple-region (for example there are two multiple-regions), then the process proceeds to step S18, where it is determined whether it is the last antenna, as described above, and, if it is not the last antenna, the process proceeds to step S19 where the interrogation signal transmission timing setting unit 1013 adjusts the time when the next antenna transmits an interrogation signal, and the process proceeds to step S20 where the next antenna reads the tags, and then loops to step S12 to repeat the process thereafter.

Figure 14:
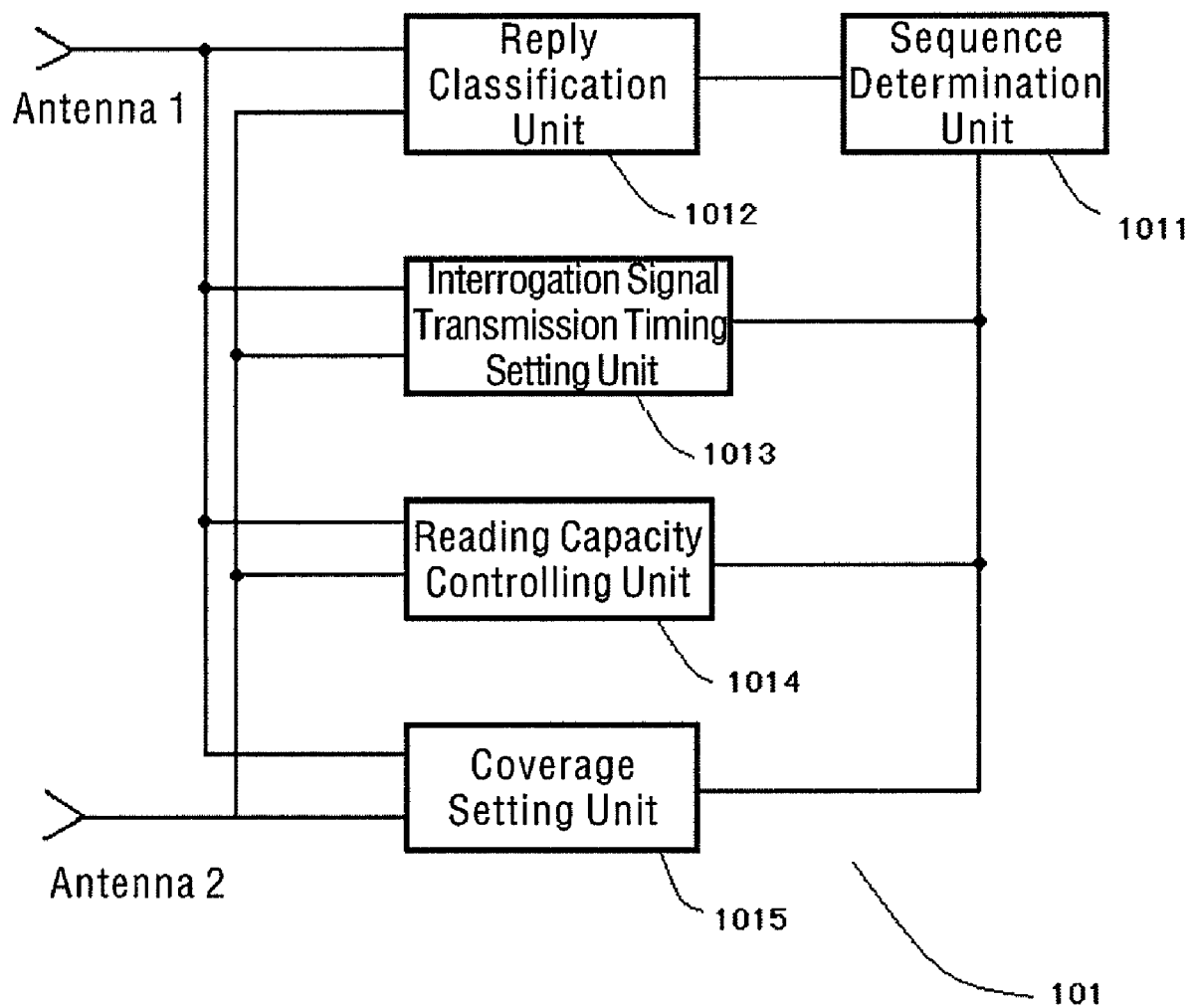
FIG. 14 shows an RFID reading apparatus according to another embodiment of the invention.

FIG. 14 shows an RFID reading apparatus 101 according to another embodiment of the invention. As shown in the figure, the RFID reading apparatus 101 according to another embodiment of the invention further includes a reading capacity controlling unit 1014 and a coverage setting unit 1015 in addition to the parts of the RFID reading apparatus 101 shown in FIG. 7.

The reading capacity controlling unit 1014 can control the read capacity for completing read in shorter time to make the information pure and clear. The capacity is important for an RFID detector to read multiple RFID tags. It takes more time to read a larger number of RFID tags than a single RFID tag. When the time that RFID tags sojourn in RF region is less than the transaction time, the returned information cannot be caught by the RFID reading apparatus, and therefore the read will fail with a high probability. Therefore, in the application of the invention, the inventory mode does not work usually. It is needed to limit the number of a read for completing a reading. Adjusting the read mode between inventory and global scroll for reading tag(s) faster is helpful to reduce the observation time, and as a result, increase the moving speed of the sequence.

Figure 15:
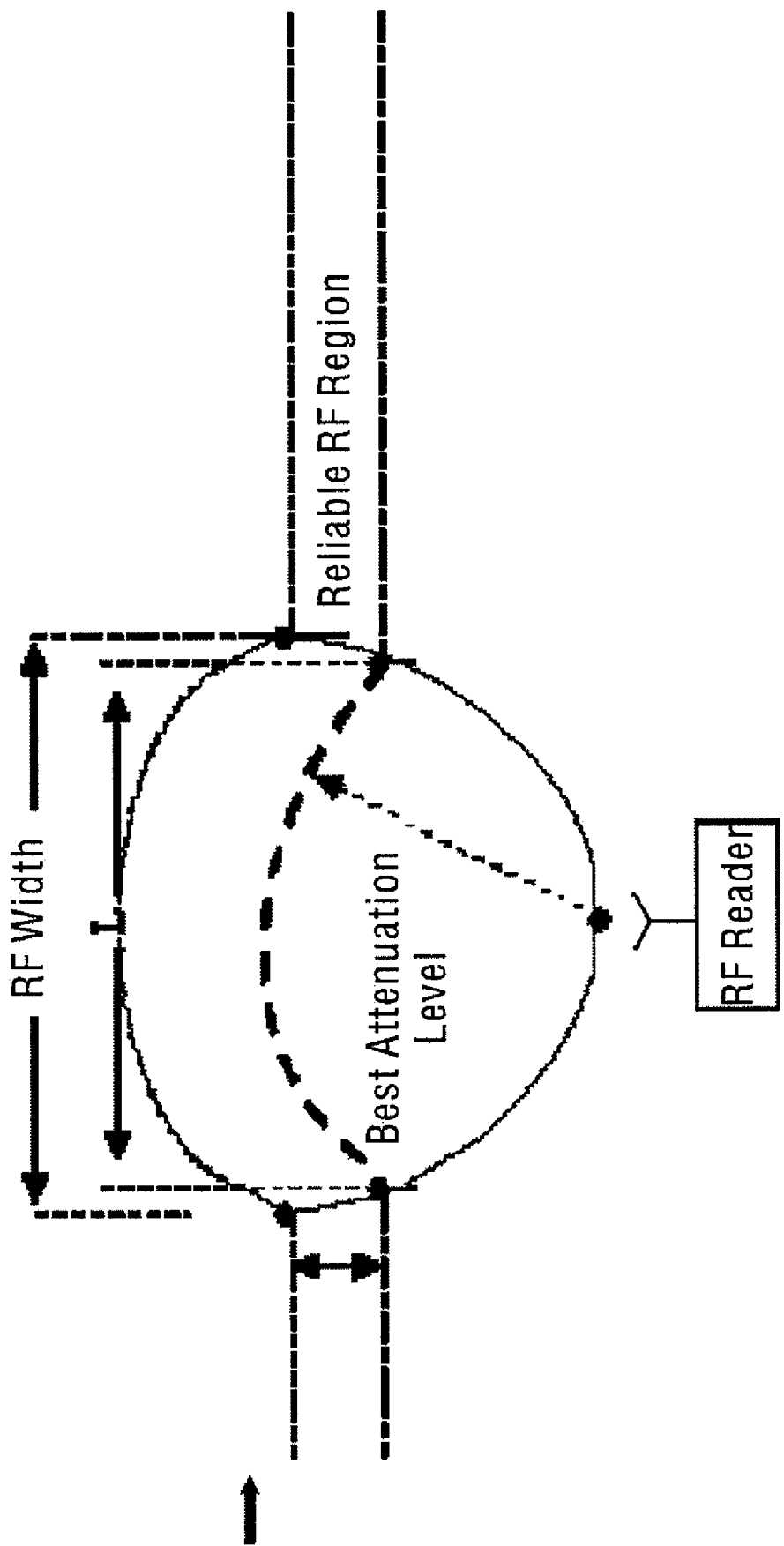
FIG. 15 shows the optimal attenuation level and reliable RF region.

The coverage setting unit 1015 sets the coverage of either of the antennas 1 and 2 so that only a particular number of tags can receive an interrogation signal transmitted by that antenna. Specifically, it adjusts the attenuation level of the antennas to make sure that there are less than n tags in the coverage, which is helpful to decide the order of a pair of tags and a sequence of tags. The optimal attenuation level and reliable RF region are shown in FIG. 15.

The method of the invention works better than BP because it utilizes "structural Information". It uses "Minor Improvement of G" to get "Large Improvement of AP" in order to improve the probability of deciding the correct order of a moving RFID sequence.

Although the invention has been described with reference to the specific preferred embodiments thereof, it is to be understood by those skilled in the art that various modifications in terms of form and detail can be made thereto without departing from the spirit and scope of the invention as defined by the attached claims.

For example, the tag identification system, the tag reading apparatus and the method for determining order of tags of the invention have been explained above with the RFID identification system, the RFID reading apparatus and the method for determining the order of RFID tags as examples respectively. However, it is to be understood by those skilled in the art that the tag identification system, tag reading apparatus and method for determining order of tags of the invention are not limited to the specific embodiments presented. The principle of the invention can also be applied in other situations where a tag reading apparatus is used to read data returned from moving tags and determine the order of the tags so as to determine the order of the items attached with the tags.

The invention claimed is:

1. A tag identification system comprising a tag reading apparatus and a plurality of tags, wherein:
   the tag reading apparatus has at least two antennas, wherein the apparatus transmits an interrogation signal within the coverage of each of the antennas;
   the plurality of tags sequentially pass by the coverage of each of the at least two antennas, each of the plurality of tags returning a reply to the at least two antennas in response to a received interrogation signal; and
   the tag reading apparatus includes a sequence determination unit which determines the sequence in which the plurality of tags pass by based on replies returned from the plurality of tags and received by the at least two antennas;
   wherein the tag reading apparatus further comprises a reply classification unit which classifies the replies received by each of the at least two antennas to determine whether the replies come from a single-region in which the received replies include only a reply returned from one of the plurality of tags or a multiple-region in which the received replies include replies returned from more than one of the plurality of tags, and sends the result of the classification to the sequence determination unit.

2. The tag identification system according to claim 1, wherein the tag reading apparatus further comprises an interrogation signal transmission timing setting unit for setting the timing of transmitting an interrogation signal from each of the at least two antennas, and, in the event that the sequence determination unit cannot uniquely determine the sequence of the plurality of tags based on replies received by a particular one of the at least two antennas, adjusting the timing of transmitting an interrogation signal from an antenna subsequent to the particular one antenna.

3. The tag identification system according to claim 1, wherein the tag reading apparatus further comprises a reading capacity controlling unit for controlling the reading capacity of each of the at least two antennas so that reading of tags can be completed in a minimal time.

4. The tag identification system according to claim 1, wherein the tag reading apparatus further comprises a coverage setting unit which sets the coverage of an antenna of the at least two antennas so that only a particular number of tags can receive an interrogation signal transmitted by the antenna.

5. The tag identification system according to claim 1, wherein the tag reading apparatus is radio frequency identification (RFID) reading apparatus, and the plurality of tags are a plurality of RFID tags.

6. A tag reading apparatus for reading a plurality of tags sequentially passing by the apparatus, the tag reading apparatus at least comprising:
at least two antennas for transmitting an interrogation signal to the plurality of tags passing by the coverage thereof and receiving a reply returned from each of the tags in response to the received interrogation signal; and
a sequence determination unit which determines the sequence of the plurality of tags based on replies returned from the tags and received by the at least two antennas;
further comprising a reply classification unit which classifies the replies received by each of the at least two antennas to determine whether the replies come from a single-region in which the received replies include only a reply returned from one of the plurality of tags or a multiple-region in which the received replies include replies returned from more than one of the plurality of tags, and sends the result of the classification to the sequence determination unit.

7. The tag reading apparatus according to claim 6, further comprising an interrogation signal transmission timing setting unit for setting the timing of transmitting an interrogation signal from each of the at least two antennas, and, in the event that the sequence determination unit cannot uniquely determine the sequence of the plurality of tags based on replies received by a particular one of the at least two antennas, adjusting the timing of transmitting an interrogation signal from an antenna subsequent to the particular one antenna.

8. The tag reading apparatus according to claim 6, further comprising a reading capacity controlling unit for controlling the reading capacity of each of the at least two antennas so that reading of tags can be completed in a minimal time.

9. The tag reading apparatus according to claim 6, further comprising a coverage setting unit which sets the coverage of an antenna of the at least two antennas so that only a particular number of tags can receive an interrogation signal transmitted by the antenna.

10. The tag reading apparatus according to claim 6, wherein the tag reading apparatus is radio frequency identification (RFID) reading apparatus, and the plurality of tags are a plurality of RFID tags.

11. A method for determining the sequence in which a plurality of tags pass by a tag reading apparatus, comprising:
an interrogation signal transmitting step for transmitting an interrogation signal from each of the at least two antennas of the tag reading apparatus to the plurality of tags within a coverage thereof,
a reply receiving step for receiving replies returned from the plurality of tags in response to the received interrogation signal by each of the at least two antennas of the tag reading apparatus; and
a sequence determination step for determining the sequence in which the plurality of tags passes by based on the received replies;
further comprising a reply classification step for classifying the replies received by each of the at least two antennas to determine whether the replies come from a single-region in which the received replies include only a reply returned from one of the plurality of tags or a multiple-region in which the received replies include replies returned from more than one of the plurality of tags, and wherein the sequence determination step, the sequence in which the plurality of tags pass by is determined based on the result of the classification and the sequence in which the received replies are retuned.

12. The method according to claim 11, further comprising an interrogation signal transmission timing setting step for setting the timing of transmitting an interrogation signal from each of the at least two antennas, and, in the event that the sequence determination step cannot uniquely determine the sequence of the plurality of tags based on replies received by a particular one of the at least two antennas, adjusting the timing of transmitting an interrogation signal from a subsequent antenna.

13. The method according to claim 11, further comprising a reading capacity controlling step for controlling the reading capacity of each of the at least two antennas so that reading can be completed in a minimal time.

14. The method according to claim 11, further comprising a coverage setting step for setting the coverage of an antenna of the at least two antennas so that only a particular number of tags can receive an interrogation signal transmitted by the antenna.

15. The method according to claim 11, wherein the tag reading apparatus is radio frequency identification (RFID) reading apparatus, and the plurality of tags are a plurality of RFID tags.

* * * * *